United States Patent

Chun et al.

[11] Patent Number: 5,926,102
[45] Date of Patent: Jul. 20, 1999

[54] METHOD FOR CONTROLLING BIDIRECTIONAL LINE PROTECTION SWITCHING BY USING A REMOTE DEFECT INDICATION SIGNAL

[75] Inventors: Kyung-Gyu Chun; Yoo-Kyoung Lee, both of Daejeon, Rep. of Korea

[73] Assignees: Electronics and Telecommunications Research Institute, Daejeon; Korea Telecom, Seoul, both of Rep. of Korea

[21] Appl. No.: 08/891,494

[22] Filed: Jul. 11, 1997

[30] Foreign Application Priority Data

Nov. 16, 1996 [KR] Rep. of Korea ...................... 96-54744

[51] Int. Cl.[6] ...................................................... H04L 1/00
[52] U.S. Cl. ................................ 340/825.16; 340/825.06; 370/225; 370/223; 370/224; 379/26; 379/242; 379/258; 379/268
[58] Field of Search .......................... 340/825.16, 825.06, 340/825.79, 825.8, 826, 827; 370/223–5, 216, 7; 359/142, 3, 147; 379/242, 26, 258, 268

[56] References Cited

U.S. PATENT DOCUMENTS

| 4,835,763 | 5/1989 | Lau ......................................... 370/223 |
| 5,327,172 | 7/1994 | Tran et al. ............................... 348/378 |
| 5,483,519 | 1/1996 | Satomi et al. ........................... 370/223 |
| 5,515,429 | 5/1996 | Kawada et al. ......................... 379/279 |
| 5,568,135 | 10/1996 | Shinozaki ........................... 340/825.06 |
| 5,594,426 | 1/1997 | Ushijima et al. ................... 340/825.02 |
| 5,717,796 | 2/1998 | Clendening ............................... 385/24 |
| 5,751,696 | 5/1998 | Bechtel et al. .......................... 370/223 |

OTHER PUBLICATIONS

International Telecommunication Union, Characteristics of Synchronous Digital Hierarchy (SDH) Equipment Functional Blocks, ITU–T Recommendation G. 783, Jan. 1994, pp. 62–71.

Primary Examiner—William A. Cuchlinski, Jr.
Assistant Examiner—Yonel Beaulieu
Attorney, Agent, or Firm—Jacobson, Price, Holman & Stern, PLLC

[57] ABSTRACT

A method for controlling bidirectional line protection switching by using a remote defect indication signal. The method includes the following steps of: inserting and transmitting a remote defect indication signal through the opposite directional link, in case the receiving end of working line detects a defect while a traffic is transmitted via a bidirectional link, and then switching to a back-up line by controlling the selector of the receiving station; and switching to the protection line by controlling the selector of the transmitting station, in case the remote defect indication signal is detected via the opposite directional link.

1 Claim, 3 Drawing Sheets

METHOD FOR CONTROLLING BIDIRECTIONAL LINE PROTECTION SWITCHING BY USING A REMOTE DEFECT INDICATION SIGNAL

BACKGROUND OF THE INVENTION

1. Field of the Invention

The present invention relates to a method for controlling 1+1 bidirectional line protection switching by using a remote defect indication signal, and more particularly to a method for switching a working line to a protection line by transmitting a remote defect indication signal to a transmitting end of the working line via an opposite-directional link, in case of detecting a defect on a receiving end of working line.

2. Description of the Related Art

In general, when a defect takes place on the line carrying a traffic, a protection line is used for protecting a current traffic. In case of bidirectional traffic transmission, when a defect is detected on working line of a system having a 1+1 structure, not only is the working line switched to the protection line, but an opposite directional link is simultaneously switched. This kind of line protection switching is called "1+1 bidirectional line protection switching".

A system used for either Synchronous Digital Hierarchy (hereinafter, referred to as SDH) or Synchronous Optical NETwork (hereinafter, referred to as SONET) is designed to notify a defect state to an upward link when a defect is detected on a downward link.

FIG. 1 illustrates a flow chart of controlling a prior line protection switching.

According to a related art, in case a defect is generated on a link(for example, from station A to station B) while a traffic transmission, a receiving end of the station B comes to detect the defect(step 1), and then transmits a selector control signal, i.e., a line switching signal to an opposite station A(step 2).

Meanwhile, when the station A receives the selector control signal, the station A selects the protection line by controlling a selector(step 3), and then transmits a response signal to the station B(step 4). Similarly, the station B selects the protection line by controlling a selector after receiving the response signal from the station A(step 5).

Finally, the station B sends a traffic transmission line number to the station A(step 6), and then the station A sends the traffic transmission line number to the station B, as well(step 7).

However, the above line protection switching takes lots of time. Therefore, the above mentioned method for controlling a line protection switching has a burden to eliminate such a problem as a time constraint. That is, especially when the above method is applied to a very long-distance transmission system, the line protection switching procedure may not be finished within the minimum switching completion time of 50 msec.

SUMMARY OF THE INVENTION

Therefore, it is an object of the present invention to provide a method for switching a receiving end of both stations to a protection line bidirectionally and simultaneously by transmitting a remote defect indication signal, whose speed is equal to the main signal speed, via the opposite-directional link to a transmitting end, in case of detecting a defect on the receiving end of working line. Thus, the main feature of the present invention is that the present invention does not need any procedures in conjunction with response signal, resulting in a swift line protection switching.

In accordance with the preferred embodiment of the present invention, a method for controlling bidirectional line protection switching by using a remote defect indication signal comprises the following steps of:

inserting and transmitting a remote defect indication signal through the opposite directional link, in case the receiving end of working line detects a defect while a traffic is transmitted via a bidirectional link, and then switching to a protection line by means of controlling the selector of the receiving station; and switching to the protection line by means of controlling the selector of the transmitting station, in case the remote defect indication signal is detected via the opposite directional link.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiment of the present invention will be described in detail referring to the attached drawings.

Figure 2:
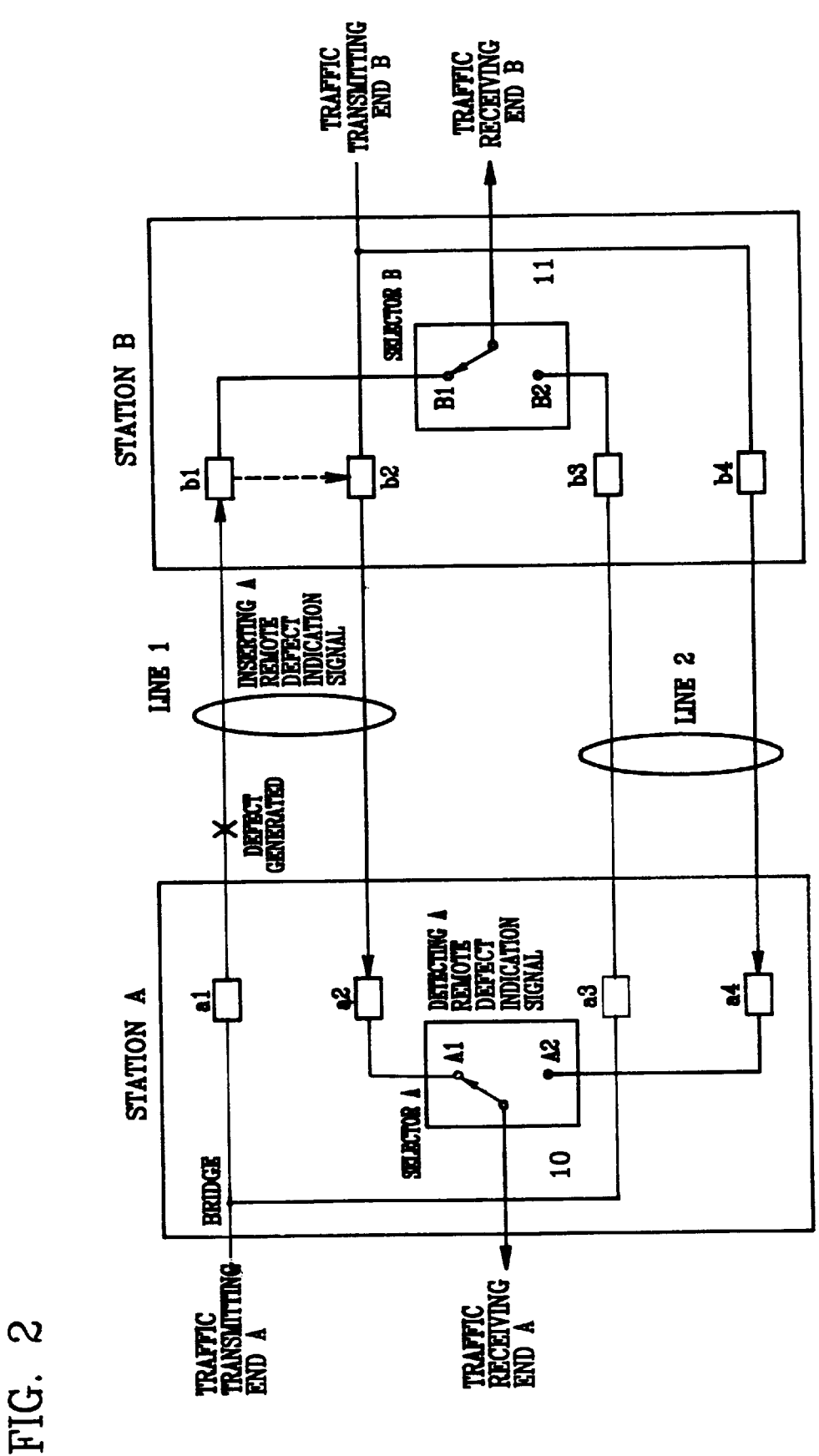
FIG. 2 illustrates a schematic diagram of a line protection switching system in accordance with the present invention.

FIG. 2 illustrates a schematic diagram of a line protection switching system in accordance with the present invention.

As shown in FIG. 2, the transmitting ends A and B of the stations A and B has a working line(line 1) and a protection line(line 2) which are bridged over each other. In addition, the receiving ends A and B of the stations A and B are designed to select either the working line(line 1) or the protection line(line 2) by way of the selectors 10 and 11.

In the meantime, the traffic receiving parts a2, a4, b1, b3 are responsible for detecting a defect on each link i.e., a upward link or a downward link, and for detecting a remote defect indication signal, as well. The traffic transmitting parts a1, a3, b2, b4 play a role in inserting and transmitting the remote defect indication signal over the opposite directional link.

For example, when a failure is occurred over a downward link(from the traffic transmitting part a1 to the traffic receiving part b1) of the working line(line 1), the traffic receiving part b1 of the station B detects a defect, and sends a control signal to the traffic transmitting part b2, whereby the remote defect indication signal is inserted and transmitted through an upward link(from the traffic transmitting part b2 to the traffic receiving part a2). Simultaneously, the station B accomplishes a line switching by controlling the selector 11, such that the traffic receiving part b3 of the protection line(line 2) is connected to the receiving end of the station B.

In addition, in case the traffic receiving part a2 detects the remote defect indication signal by way of the upward link, the station A controls the selector 10 such that the traffic receiving part a4 of the protection line(line 2) is connected to the receiving end of the station A.

Figure 3:
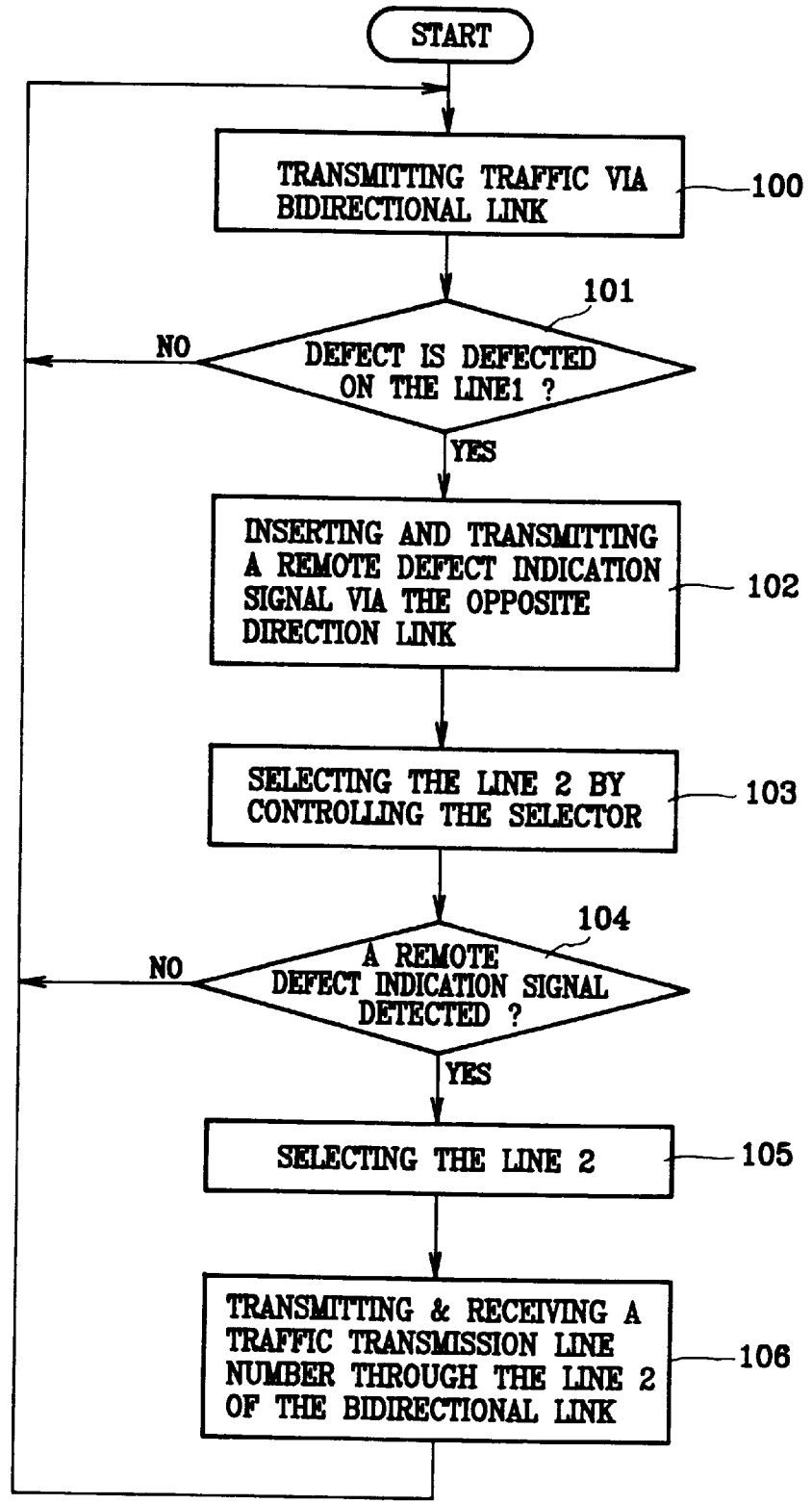
FIG. 3 illustrates a flow chart of controlling a line protection switching in accordance with the present invention.

FIG. 3 illustrates a flow chart of controlling a line protection switching in accordance with the present invention.

Figure 1:
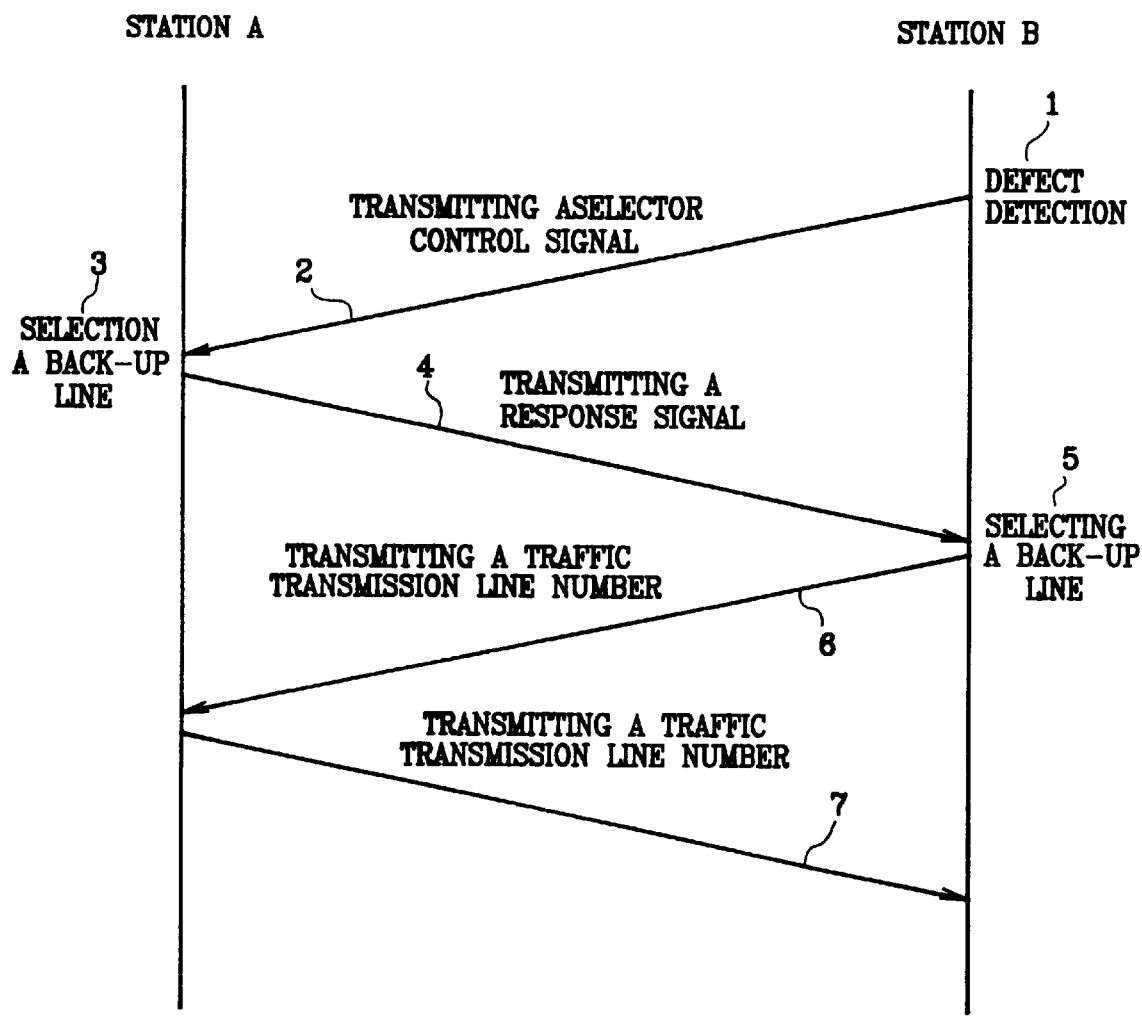
FIG. 1 illustrates a flow chart of controlling a prior line protection switching.

With respect to the flow chart shown in FIG. 1, first a traffic is transmitted via a bidirectional link(step 100). Whether or not the receiving part of working line detects a defect is checked(step 101). In case a defect is detected, a remote defect indication signal is inserted and transmitted through the opposite directional link(step 102), and then the protection line is selected after controlling the selector 11 of the receiving station(step 103). Then, whether or not the remote defect indication signal is received via the opposite directional link is checked(step 104).

In case the remote defect indication signal is received, the protection line is selected after controlling the selector 10(step 105). Finally, the stations A and B transmit a traffic transmission line number via the bidirectional link of the protection line(step 106).

As described above, the present invention can guarantee the stability of the system such as a satellite communication system, a submarine optic cable system, etc. by preventing traffic information loss resulting from the delay of the line protection switching.

While the invention has been particularly shown and described with reference to a preferred embodiment, it will be understood by those skilled in the art that various changes in form and detail may be made therein without departing from the spirit and scope of the invention.

What is claimed is:

1. A method for controlling bidirectional line protection switching by using a remote defect indication signal, applied to a transmission system having two stations in which the traffic transmitting end of both a working line and a protection line are bridged over each other, comprising the steps of:

inserting and transmitting a remote defect indication signal through an opposite directional link, in case a receiving end of the working line detects a defect while a traffic is transmitted via a bidirectional link, and then switching to a first protection line by means of controlling a first selector of a first station; and simultaneously switching to a second protection line by means of controlling a second selector of a second station, in case the remote defect indication signal is detected via the opposite directional link, while a traffic is transmitted via a bidirectional link.

* * * * *